(12) United States Patent
Kertesz et al.

(10) Patent No.: US 7,828,338 B2
(45) Date of Patent: Nov. 9, 2010

(54) COUPLING ASSEMBLY WITH PIPE SOCKETS OF FLUID-HOLDING PARTS TO BE JOINED

(75) Inventors: Janos Kertesz, Hofheim (DE); Gerhard Wachter, Büdigen (DE)

(73) Assignee: Norma Germany GmbH, Maintal (DE)

( * ) Notice: Subject to any disclaimer, the term of this patent is extended or adjusted under 35 U.S.C. 154(b) by 912 days.

(21) Appl. No.: 11/642,358

(22) Filed: Dec. 20, 2006

(65) Prior Publication Data
US 2007/0152444 A1    Jul. 5, 2007

(30) Foreign Application Priority Data
Jan. 5, 2006    (EP)    ................. 06000154

(51) Int. Cl.
*F16L 47/14*    (2006.01)
*F16L 23/036*    (2006.01)

(52) U.S. Cl. ................. 285/365; 285/252; 285/407; 285/420

(58) Field of Classification Search ................. 285/252, 285/253, 254, 364, 365, 373, 406, 407, 419, 285/420
See application file for complete search history.

(56) References Cited

U.S. PATENT DOCUMENTS

| | | | | |
|---|---|---|---|---|
| 41,630 | A | * | 2/1864 | Burney ................. 24/20 EE |
| 1,255,023 | A | * | 1/1918 | Lang ........................ 285/45 |
| 2,473,102 | A | * | 6/1949 | Krooss ..................... 285/112 |
| 2,709,094 | A | * | 5/1955 | Polanski ................... 285/407 |
| 2,826,437 | A | * | 3/1958 | Detweiler et al. ......... 285/233 |
| 3,013,821 | A | * | 12/1961 | Bogan ..................... 285/407 |
| 3,152,817 | A | * | 10/1964 | Watson et al. ............ 285/141.1 |
| 3,669,474 | A | * | 6/1972 | Bode ....................... 285/336 |
| 4,037,859 | A | * | 7/1977 | Clements ................... 285/5 |
| 4,202,568 | A | * | 5/1980 | Strom ...................... 285/336 |
| 4,214,586 | A | | 7/1980 | Mericle |
| 4,418,948 | A | * | 12/1983 | Lew et al. ................. 285/420 |
| 4,441,745 | A | | 4/1984 | Nicholas et al. |
| 4,443,031 | A | * | 4/1984 | Borsh et al. .............. 285/419 |
| 4,498,938 | A | * | 2/1985 | Moisson et al. ........... 156/49 |
| 4,550,927 | A | * | 11/1985 | Resele ..................... 280/281.1 |
| 4,607,866 | A | * | 8/1986 | Erlichman ................ 285/45 |

(Continued)

FOREIGN PATENT DOCUMENTS

CH    379 854    7/1964

(Continued)

*Primary Examiner*—James M Hewitt
(74) *Attorney, Agent, or Firm*—Lucas & Mercanti, LLP; Klaus P. Stoffel

(57) ABSTRACT

A coupling assembly includes pipe sockets of fluid-holding parts to be joined. The pipe sockets are provided with a peripheral locking rib, behind which a groove is formed and which has a conical front flank and a radial rear flank. The front flanks of the locking ribs lie opposite each other. The rear flank of one locking rib bounds a groove. The coupling assembly also contains a steel spring band, which is curved more than 240° and whose axial ends have inwardly directed flanges which engage behind the locking ribs and are interrupted on the side of the spring band opposite the ends of the spring band. The front flanks of the locking ribs enclose an angle <50° with the center axis, the radius of the smallest circumference of the front flanks is smaller than the inner radius of the flanges of the spring band.

23 Claims, 9 Drawing Sheets

U.S. PATENT DOCUMENTS

| | | | |
|---|---|---|---|
| 4,632,435 A | 12/1986 | Polyak et al. | |
| 4,695,079 A * | 9/1987 | Weinhold | 285/278 |
| 4,776,721 A * | 10/1988 | Lange | 403/171 |
| 5,048,875 A | 9/1991 | Usui et al. | |
| 5,527,072 A | 6/1996 | Norkey et al. | |
| 5,630,255 A * | 5/1997 | Eliasson | 24/274 R |
| 5,735,555 A | 4/1998 | Answine et al. | |
| 6,361,082 B1 * | 3/2002 | Hauki et al. | 285/253 |
| 7,240,930 B2 * | 7/2007 | Stravitz | 285/419 |
| 2002/0000721 A1 | 1/2002 | Ohya | |
| 2004/0070205 A1 | 4/2004 | Thomas et al. | |
| 2004/0135371 A1 | 7/2004 | Masuda et al. | |
| 2006/0152005 A1 * | 7/2006 | Kertesz et al. | 285/406 |

FOREIGN PATENT DOCUMENTS

| | | |
|---|---|---|
| DE | 36 27 708 | 3/1988 |
| DE | 4126708 A1 * | 2/1993 |
| DE | 196 48 162 | 5/1998 |
| DE | 198 00 283 | 7/1999 |
| DE | 198 18 562 | 2/2000 |
| EP | 0 046 616 | 3/1982 |
| EP | 1 378 701 | 1/2004 |
| FR | 2 451 535 | 10/1980 |
| GB | 2 086 514 | 5/1982 |

* cited by examiner

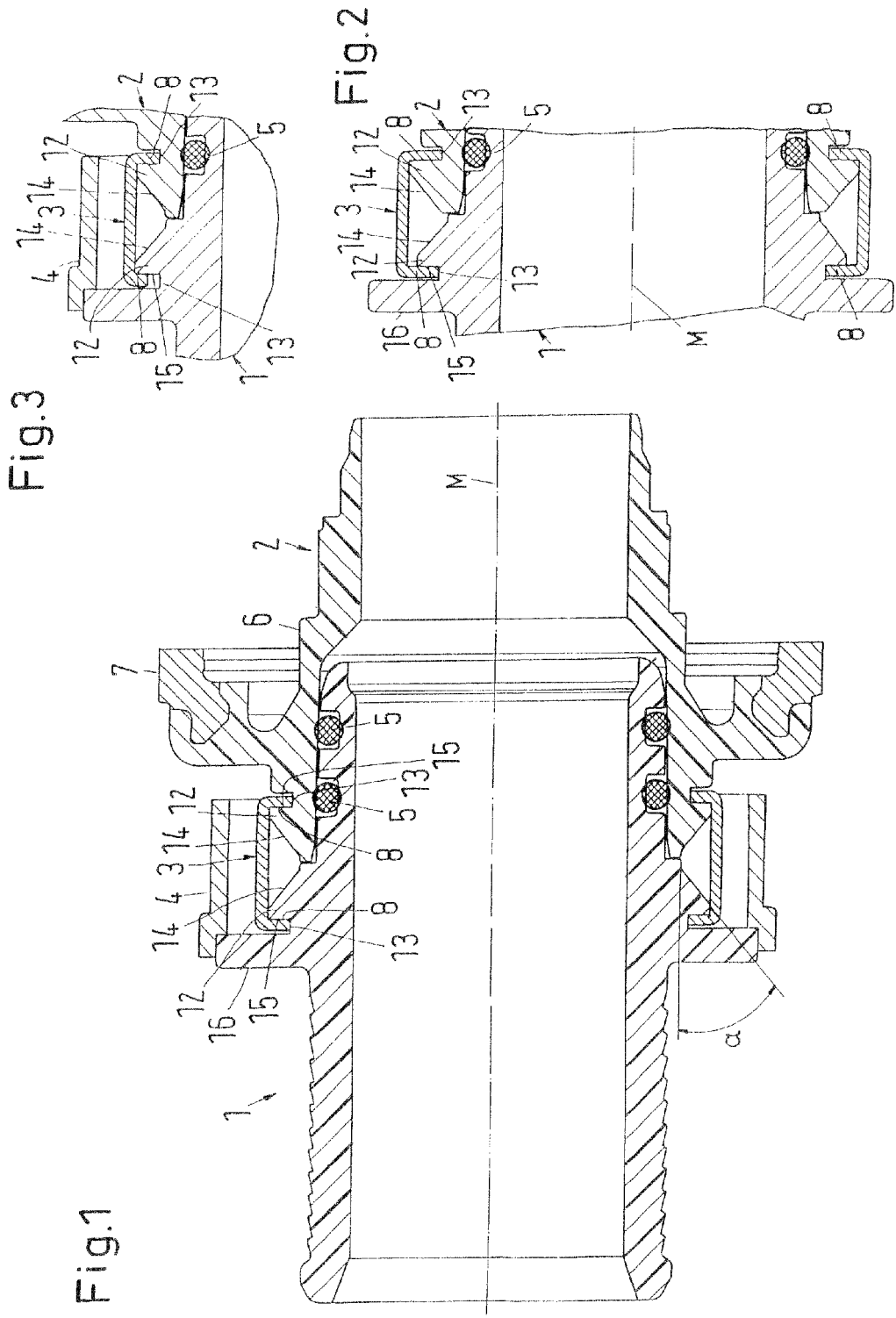

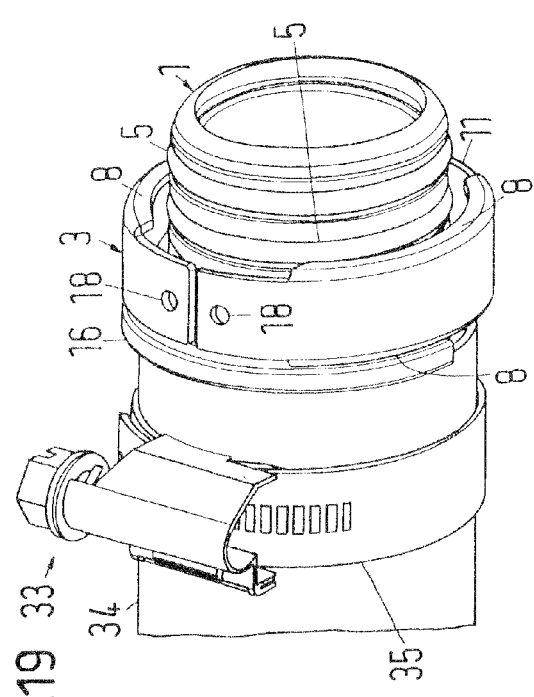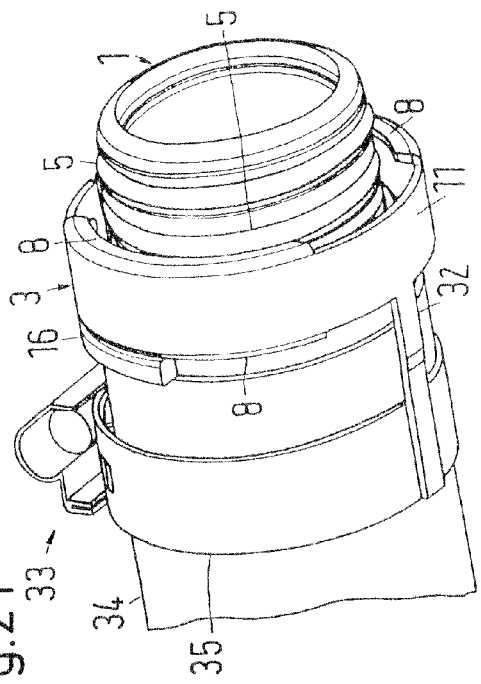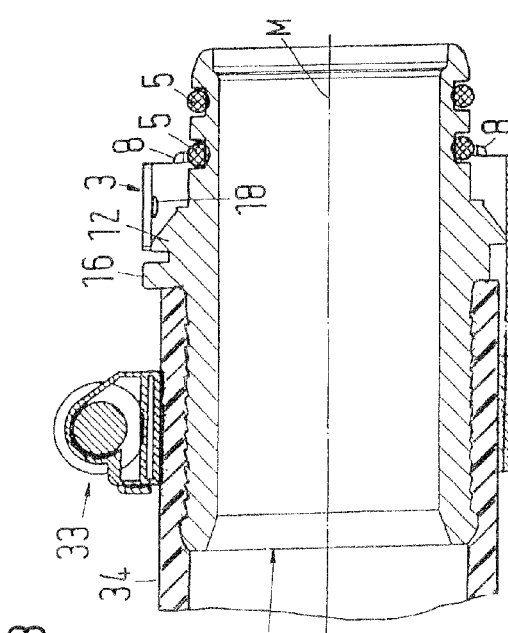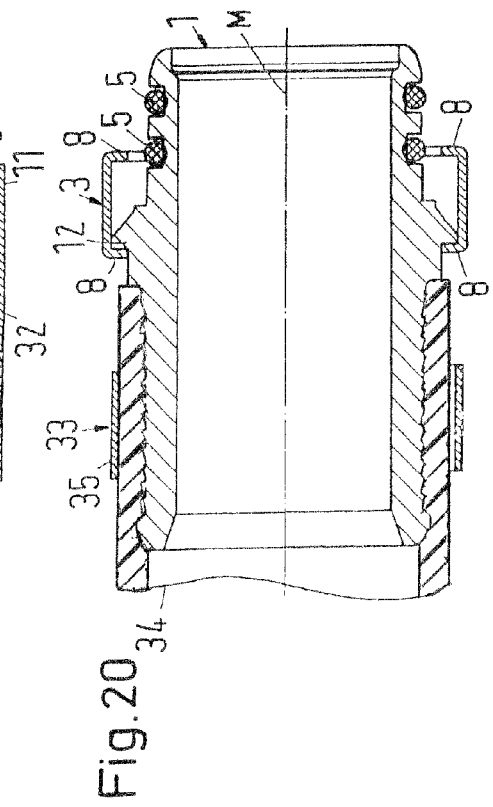

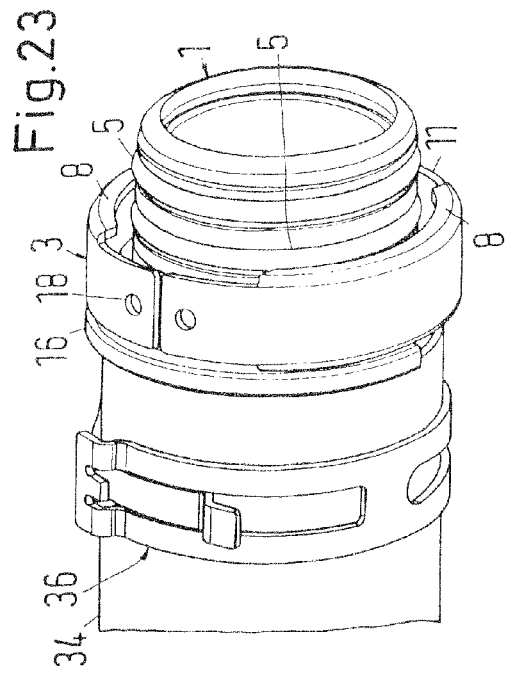
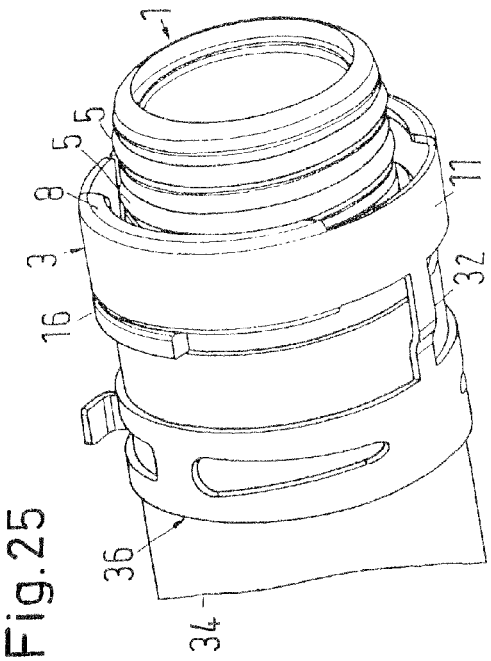
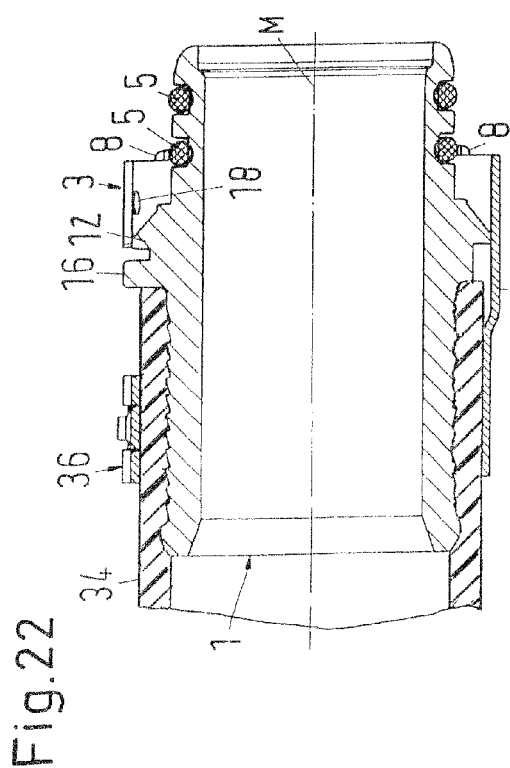
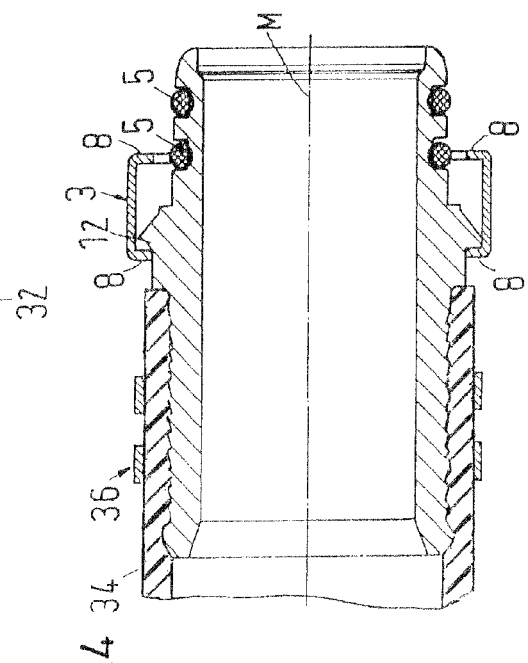

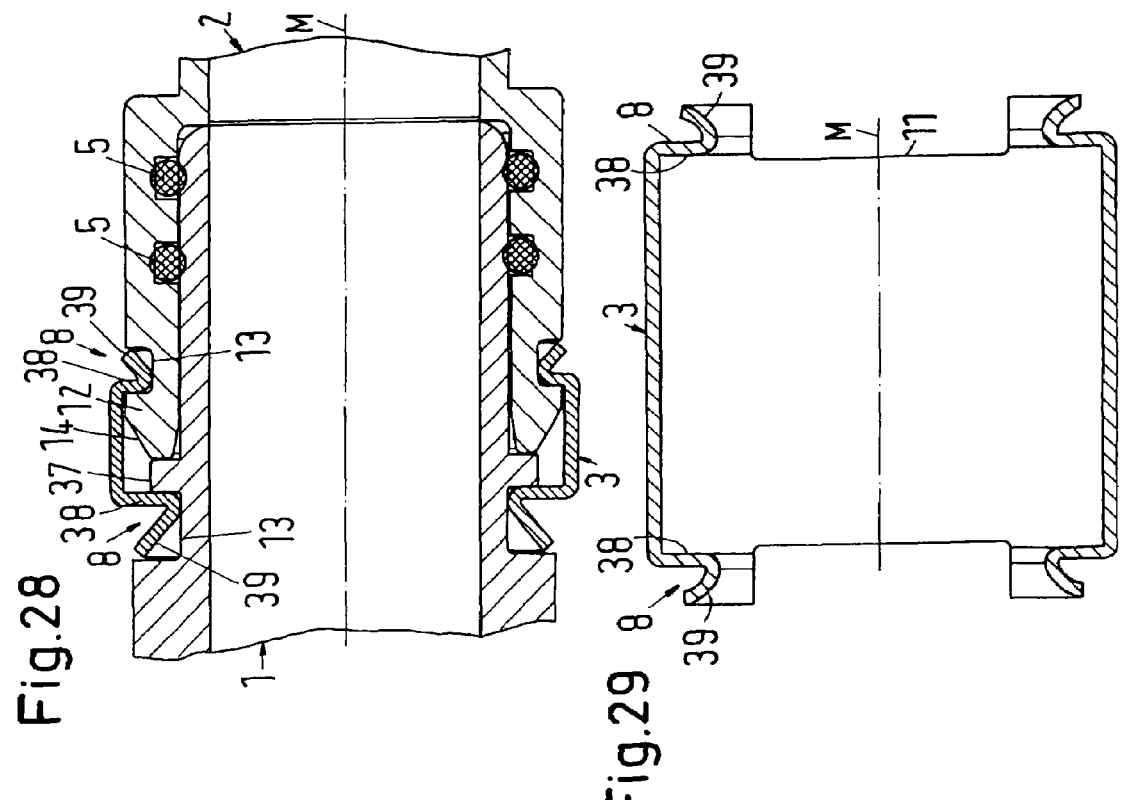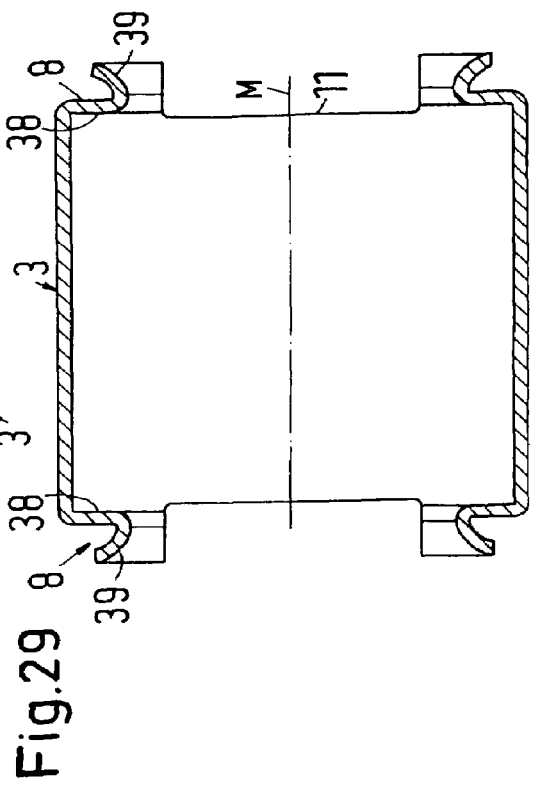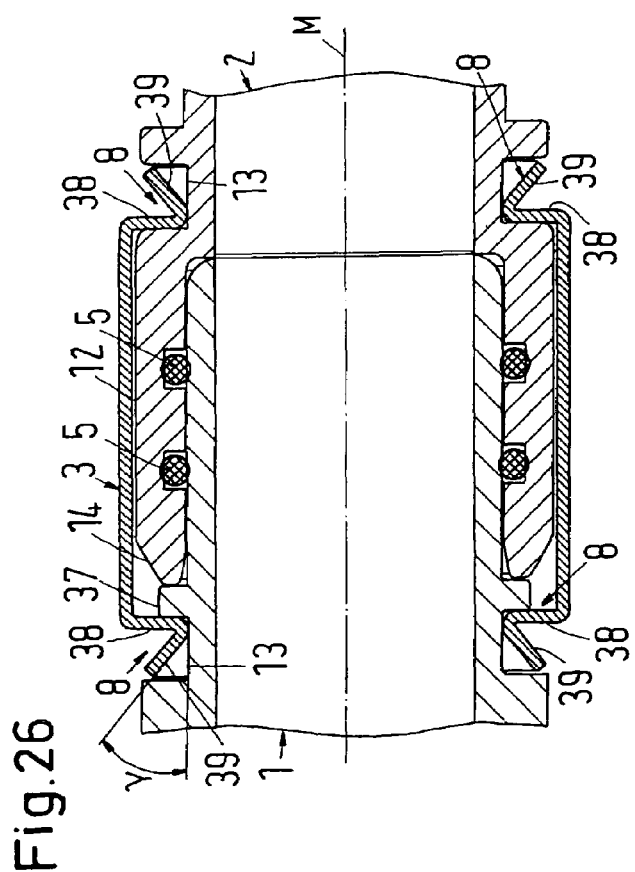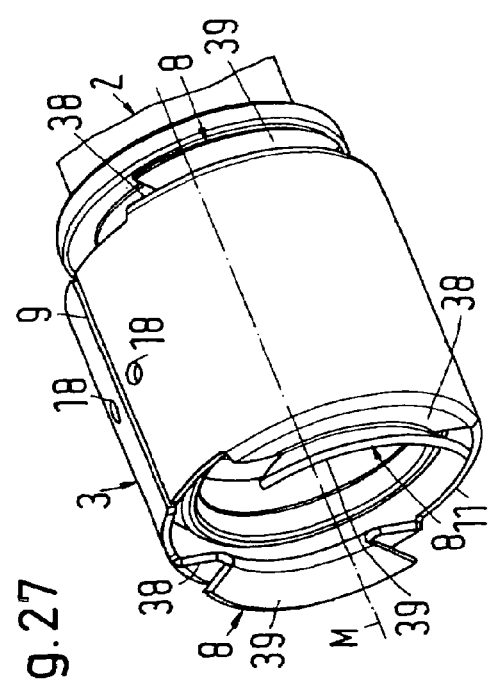

COUPLING ASSEMBLY WITH PIPE SOCKETS OF FLUID-HOLDING PARTS TO BE JOINED

BACKGROUND OF THE INVENTION

1. Field of the Invention

The invention relates to a coupling assembly with pipe sockets of fluid-holding parts to be joined, such as fluid lines and tanks, wherein the pipe sockets are each provided with a locking rib that is coaxial with their center axis, behind which locking rib a groove is formed and which locking rib has a conical front flank that is coaxial with the center axis and a radial rear flank, wherein the front flank of one of the locking ribs is opposite the front flank of the other locking rib, and the rear flank of at least one locking rib forms one of the walls of the adjacent groove, and with a steel spring band, which is largely circularly curved over more than 240° and whose axial ends have inwardly directed flanges with an inner edge that has the approximate form of a circular arc and is coaxial with the center axis, which flanges engage behind the locking ribs and are interrupted at least on the side of the spring band that lies opposite the circumferential ends of the spring band, and wherein the pipe sockets are partially fitted into each other, and the parts of the pipe sockets that are fitted together are sealed from each other by at least one gasket.

The invention also relates to a coupling assembly with pipe sockets of fluid-holding parts to be joined, such as fluid lines and tanks, wherein the pipe sockets are each provided with a locking rib with a radial rear flank, which locking rib is coaxial with the center axis of the pipe sockets, wherein the rear flank of at least one of the locking ribs bounds a groove, and with a steel spring band, which is largely circularly curved over at least 240° and whose axial ends have inwardly directed flanges with an inner edge that has the approximate form of a circular arc and is coaxial with the center axis, which flanges engage behind the locking ribs and are interrupted at least on the side of the spring band that lies opposite the circumferential ends of the spring band, and wherein the pipe sockets are partially fitted into each other, and the parts of the pipe sockets that are fitted together are sealed from each other by at least one gasket.

2. Description of the Related Art

In the coupling assembly described above, the spring band is expanded to place it radially onto the locking ribs of the pipe socket. However, the pipe sockets cannot be inserted axially into the spring band, as in the case of a plug coupling, because one of the flanges moves axially into the groove behind one of the locking ribs until the other flange rests against this locking rib, and there is no longer any free space to receive the other locking rib between the flanges. Other well-known coupling assemblies with a spring band, e.g., the spring band disclosed in DE 198 18 562 C1 or in DE 198 00 283 C1, which is a so-called "shaped clip", serve the purpose of joining pipes which are provided at their ends with locking ribs in the form of flanges, whose flanks facing away from the ends are conical. The spring band consists of steel sheet. Its lateral edges are bent inward at an angle of less than 90° to form the flanges. The angle corresponds to the cone angle of the flanges at the ends of the pipe. A slit between the ends of the spring band can be bridged by a snap closure or joint closure. The joint opposite the slit is formed by the material of the spring band in the vicinity of an interruption of the flange of the spring band as a type of "film joint" or by another joint closure. During the joining of the pipes, the spring band is placed around the flanges of the pipes with the closure open (or with the closures open), and then the closure or each closure is closed again. During this operation, the flanges of the spring band come to lie against the conical flanks of the pipe flanges, so that the ends of the pipes are drawn together. Although the steel sheet of the spring band is flexible in the vicinity of the joint in the embodiment with a "film joint" (DE 198 18 562 C1), it does not exert any radial clamping force on the pipes. The clamping force is based solely on the tension force of the closure or closures. Therefore, a coupling assembly with a shaped clip is not suitable as an easily closed plug coupling, in which the ends of the pipe only need to be axially inserted into the shaped clip, and the flanges lock into place behind the locking ribs on the pipes during the insertion process to produce the connection. The manufacture of the spring band with a snap closure, which is formed as a single part with the spring band, requires expensive punching and bending tools. The manufacture of the spring band with a joint closure additionally requires the formation and mounting of the joint closure.

In a plug coupling of the type disclosed in EP 1 378 701 A1, the coupling consists of elastic plastic. It has two oval rings that are joined by two diametrically opposite webs. The rings have two inner detents. When the pipe ends are inserted into the rings, the rings are elastically expanded by locking ribs on end sections of the pipes until the detents of the rings snap into place behind the locking ribs. In the coupled state, a clearance remains between the ring regions with the smaller radius of curvature and the pipes, and this clearance allows radial cooperation of the rings for decoupling. The material of this coupling is limited to plastic. An expensive extrusion die is needed to produce this coupling. Due to the wide spaces between the webs and the decoupling clearance between the rings and the pipes, there is the possibility that the end sections of the pipes inserted into the coupling could soil the coupling. This can make repeated coupling and decoupling difficult.

SUMMARY OF THE INVENTION

It is an object of the invention to provide a coupling assembly of the aforementioned types which is more rugged and easier to handle and produce.

In accordance with the invention, in a first embodiment of achieving this objective, the front flanks of the locking ribs enclose an angle smaller than 50° with the center axis, the radius of the smallest circumference of the front flanks of the locking ribs is smaller than the inner radius of the flanges of the spring band, the axial width of the flanges corresponds to the width of the groove that holds them, and the spring band is noncorroding.

In accordance with the invention, in a second embodiment of meeting this object, the flanges of the spring band each have a segment that is bent radially inward and a segment that is bent obliquely outward, the oblique segment encloses an angle with the center axis of each pipe socket in the range of 10° to 60°, the diameter of the inner edge of the outer margin of the oblique segment is greater than the smallest outside diameter of the locking ribs, the axial width of at least one of the flanges corresponds to the width of the groove that holds it, and the spring band is noncorroding.

In both of these solutions to the stated problem, the coupling assembly can be easily handled like a plug coupling in order to join the pipe sockets and fluid-holding parts to which they are connected, such as fluid lines and fluid tanks, especially fuel tanks and radiators of motor vehicles. In addition, the spring band can be preassembled on one of the pipe sockets. The spring band is not only corrosion-resistant but also heat-resistant, so that the coupling assembly is also suitable for pipelines through which a very hot fluid is conveyed, such as exhaust gas pipes.

While in the first solution, the locking ribs on the pipe sockets have a conical front flank, in the second solution, the front flank of at least one of the locking ribs can be radial. Accordingly, the locking ribs can be designed very narrow, so that the spring band can also be correspondingly narrow and thus less expensive due to the use of a smaller amount of material.

The refinements described below refer to both solutions unless otherwise indicated.

For example, in one embodiment, the flanges provided at one axial end of the spring band can be shorter in the circumferential direction of the spring band than the flanges provided at the other axial end of the spring band. This facilitates the decoupling of one of the pipe sockets, since to allow decoupling, the spring band needs to be spread or expanded only until one of the pipe sockets can be pulled out between the flanges at one axial end of the spring band, while the flanges at the other axial end of the spring band can remain snapped in place behind the locking rib of the other pipe socket.

The same result can also be achieved if the flanges provided at one axial end of the spring band are narrower in the radial direction than the flanges provided at the other end of the spring band.

Another possible means of achieving this consists in making the outside diameter of one locking rib greater than that of the other locking rib.

Furthermore, at least one axial end of the spring band, at least one of the flanges can be provided with a radial opening for the insertion of a radial projection on the pipe socket inserted in this axial end. This embodiment makes it possible to join the pipe sockets only in a predetermined relative rotational angular position in cases in which this is desired.

The circumferential ends of the spring band can bound an axial slit with a width of 0-2 mm. This makes it possible to insert a simple spreading tool, e.g., the blade of a screwdriver, in order to spread or expand the spring band far enough to allow at least one of the pipe sockets to be decoupled.

In addition, the circumferential ends of the spring band can be provided with recesses to allow the insertion of a spreading tool, e.g., spreading pliers.

Alternatively or additionally to the recesses, circumferential end sections of the spring band can be provided with holes close to the slit for the insertion of a spreading tool.

Instead of a slit between the circumferential ends of the spring band, it can also be provided for circumferential end sections of the spring band to overlap. This prevents dirt or corrosive fluids from penetrating the space inside the spring band.

The same result can also be largely achieved if one of the circumferential end sections of the spring band has a narrower end piece, which extends into a circumferential slot of the other circumferential end section of the spring band.

In addition, the circumferential end sections of the spring band can each be provided with a projection that is directed away from the outer surface of the spring band for the application of a spreading tool.

These projections can be formed in a simple way by bending up circumferential end sections of the spring band.

In particular, the circumferential end sections of the spring band can be radial, flat, or bent spreading grips or they can have a hollow cylindrical shape.

In addition, plastic covers can be attached on the outside of circumferential end sections of the spring band. These covers protect the spring band, especially when it is provided with a corrosion-resistant protective coating, against shock loads, such as being struck by rocks in the engine compartment or exhaust gas area of a motor vehicle.

The covers can be attached in a simple way by positive locking on the circumferential end sections of the spring band.

This type of attachment can be realized with radial projections of the covers that snap into holes in the circumferential end sections of the spring band.

In addition, the covers can have radial flanges that cover the flanges of the spring band, so that the flanges are also protected from shock loads.

Furthermore, it is preferably provided that a cover surrounds one of the pipe sockets at a radial distance that corresponds to the maximum required spreading width of the spring band. The cover has an axial slit that leaves circumferential end sections of the spring band open. This cover provides not only for protection of the spring band and possibly of the additionally provided cover, but also for limitation of the spreading of the spring band, so that it cannot be spread or expanded excessively, especially so that it cannot be spread so far that both pipe sockets can become decoupled when it is intended that only one pipe socket should be decoupled and the spring band should remain mounted on the other pipe socket.

The cover can be attached radially on one of the pipe sockets by the simple means of a snap fitting. This then makes it possible to attach it not only in advance on one of the pipe sockets but also subsequently.

The flanges and the axial middle region of the spring band that joins them can enclose an angle in the range of 15° to 90°. An angle of 90° has the advantage that the distance of the locking ribs from an opposite groove wall or housing wall can be kept smaller than if the angle is less than 90°, which means that the spring band can be designed narrower, and the pipe sockets can be designed shorter than at an angle of less than 90°. On the other hand, an angle that is smaller than 90° has the advantage that the flanges have greater stiffness or greater resistance to axial bending under an axial load of the spring band due to fluid pressure inside the pipe sockets.

In at least one of the two coupling assemblies first described at the beginning, the spring band can be connected by a connecting piece with a hose clip that is used for clamping a fluid line on one of the pipe sockets. This has the advantage that the spring band can simultaneously serve for preassembly of the hose clip on the pipe socket, before the fluid line is clamped on the pipe socket with the hose clip.

In the other embodiments of the invention described above, the spring band can also be connected by a connecting piece with a hose clip that is used to clamp a fluid line on one of the pipe sockets.

In accordance with the invention, in another solution to the problem stated above in connection with a coupling assembly with pipe sockets of fluid-holding parts to be joined, such as fluid lines and tanks, wherein the pipe sockets are each provided with a locking rib that is coaxial with their center axis and that has a radial rear flank, wherein the rear flank of at least one of the locking ribs bounds a groove, and with a steel spring band, which is largely circularly curved over at least 240° and has inwardly directed projections with radial surfaces, which rest against the rear flanks of the locking ribs, the projections are detents pushed out from the spring band, and the spring band is noncorroding.

These detents can be constructed to be especially flexurally stiff, especially when they are each pushed out at one of the edges of circumferential slots of limited length in the spring band.

In this case, it should preferably be ensured that the circumferential slots are oblong holes, each of which has a tongue that is directed transversely to the oblong hole in the flat state of the spring band. In the state of the projection in which it is pushed out of the spring band, the edge of the tongue forms the radial contact surface for contact with the rear flank of one of the locking ribs.

The pipe sockets preferably consist of plastic. Therefore, they can be shaped by simple means. If suitable reinforcing additives are used, such as glass fibers, they can also withstand high forces, especially shear forces in the vicinity of the locking ribs.

They preferably contain an electrically conducting additive, so that the coupling assembly is electrically conducting throughout via the metal spring band to avoid electrostatic charging, which is advantageous especially when the fluid-holding parts, such as fluid lines or fluid tanks, are also electrically conducting.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

The invention and its modifications are described in greater detail below with reference to the accompanying drawings, which illustrate preferred embodiments and modifications of these embodiments.

In the drawing:

FIG. 1 is an axial sectional view through a first embodiment of a coupling assembly of the invention with two pipe sockets fitted into each other, which are held together by a metal spring band with radial flanges on its radial ends, wherein the spring band is surrounded by a protective cover.

FIG. 2 is a first embodiment sectional view of a modification of the embodiment according to FIG. 1, in which the protective cover has been left off, and the outside diameters of the locking ribs of the pipe sockets are different.

FIG. 3 is a section of a coupling assembly that is a modification of the embodiment according to FIG. 1, in which one flange of the spring band is radially shorter than the other.

FIG. 18 is an axial section through a part of the coupling assembly according to FIG. 1, in which, on one of the pipe sockets, a hose clip in the form of a worm drive hose clip clamps a fluid line on the pipe socket.

FIG. 19 is a perspective view of the part of the coupling assembly illustrated in FIG. 18.

FIG. 20 is a different axial section through the part of the coupling assembly illustrated in FIG. 18.

FIG. 21 is a different perspective view of the part of the coupling assembly illustrated in FIG. 18.

FIGS. 22 to 25 show the same views as FIGS. 18 to 21, wherein the worm drive hose clip is replaced by a spring band clip.

FIG. 26 is an axial section through a coupling assembly that is somewhat modified from the coupling assembly according to FIG. 1, in which the flanges of the spring band each have a segment that is bent radially inward and a segment that is bent obliquely outward.

FIG. 27 is a perspective view of the coupling assembly according to FIG. 26 without one of the pipe sockets.

FIG. 28 shows a modification of the coupling assembly according to FIG. 26.

FIG. 29 is an axial section through a spring band that is somewhat modified from the spring band according to FIG. 26.

DETAILED DESCRIPTION OF THE INVENTION

Figure 4:
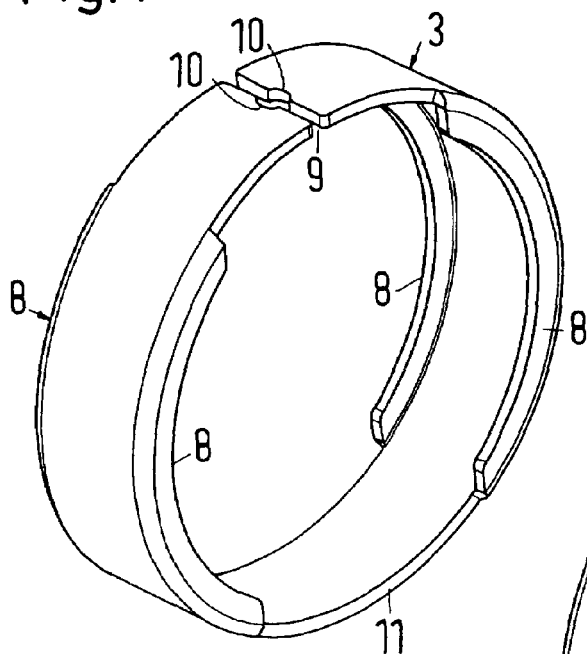
FIG. 4 is a perspective view of a spring band of the coupling assembly according to FIG. 1.

The coupling assembly according to FIG. 1 essentially consists of pipe sockets 1 and 2 that are partially fitted into each other, a spring band 3 that joins the pipe sockets 1 and 2, a cover 4, and two gaskets 5.

The pipe sockets are composed of a thermoplastic material with reinforcing material, such as glass fibers, and an electrically conducting additive. The pipe socket 2 includes of two parts 6 and 7, which are joined by positive locking and fusion bonding. Part 6 forms a diffusion barrier, which is preferably formed by a polyamide. Part 7, on the other hand, contains polyethylene, which does not form a diffusion barrier but can be fused with a suitable material, such as the high-density polyethylene of a fuel tank. To connect the pipe socket 2 with the fuel tank, part 7 is fused with the edge of the filling hole of the fuel tank.

The spring band 3 consists of metal, e.g., spring steel, and is noncorroding. For this purpose, it can consist either of noncorroding steel, especially stainless steel, or of a metal that is coated with a noncorroding material. The axial ends of the spring band 3 have flanges 8, which are bent radially inward, as also shown in FIG. 4, and the spring band 3 has an axial slit 9. The edges of the axial slit or the circumferential ends of the spring band 3 are provided with opposing recesses 10 for inserting a spreading tool (not shown), in the present case, spreading pliers. In a region of the spring band 3 diametrically opposite the slit, the flanges are interrupted, so that the spring band 3 forms an elastic joint 11 in this region.

According to FIG. 1, each pipe socket 1 and 2 is provided with a locking rib 12, which is coaxial with the center axis M of the pipe sockets 1 and 2 and behind which a peripheral groove 13 is formed. Each locking rib 12 has a conical front flank 14 that is coaxial with the center axis M and a radial rear flank 15.

The pipe sockets 1, 2 and thus the fluid-holding parts are joined with each other in such a way that first one of the pipe sockets 1, 2 is inserted, with its conical flank 14 forward, sufficiently far under the flanges 8 beyond one of the axial ends, thereby spreading the spring band, that these flanges 8 are snapped into the groove 13 behind the locking rib 2 by the spring tension of the spring band 3. Then, the other of the two pipe sockets 1, 2 is inserted, with the front flank 14 of its locking rib 12 forward and accompanied by renewed spreading of the spring band, sufficiently far into the spring band 3 that the flanges 8 provided at the other axial end of the spring band 3 are snapped into the groove 13 behind this locking rib 12. The width of the grooves 13 is approximately the same as the axial width of the flanges 8. Therefore, while the pipe sockets 1, 2 are being put together under the spring band 3, the spring band 3 cannot be axially displaced by the front flank 14 of the locking rib 12 of the pipe socket 1, 2 that is inserted last. In the assembled state of the pipe sockets 1, 2, the front flanks 14 of the locking ribs lie close together, so that the spring band 3 is relatively narrow in the axial direction and is only slightly wider than the total width of the two locking ribs 12. The front flanks 14 of the locking ribs enclose an angle α with the center axis M or the longitudinal direction of the pipe sockets, which is less than 50°, so that the pipe sockets 1, 2 can be easily inserted into the spring band 3. In addition, the radius of the smallest circumference of the front flanks 14 of the locking ribs 12 is smaller than the inside radius of the flanges 8 of the spring band 3, so that when the pipe sockets 1, 2 are being assembled, the front flanks 14 coincide with the radially inner edges of the flanges, and these edges can also slide radially outward on the front flanks 14.

The cover 4 also has a slit (not shown) that passes axially through it. It is springy and can consist of spring steel or plastic. It is snapped radially onto a flange 16, which runs at least partially around the pipe socket and bounds one of the grooves 13, and it wraps around the flange 16 by somewhat more than 180°. At the same time, the cover 4 serves to limit the maximum spreading distance of the spring band 3, so that it simultaneously ensures that the spring band 3 is expanded symmetrically with respect to the center axis M.

As FIG. 4 shows, the flanges 8 extend only so far in the circumferential direction that, to decouple or separate the pipe sockets 1, 2, the spring band 3 needs to be spread only far enough for it to be just possible to pull the locking ribs 12 out from under the flanges 8 and out of the spring band 3.

If it is desired that only one pipe socket be decoupled, e.g., pipe socket 1, and that the spring band 3 be left preassembled on the other pipe socket, then, for example, the outside diameter of the locking rib 12 of the pipe socket, for example, pipe socket 2, on which the spring band 3 is to remain preassembled can be selected somewhat larger than the outside diameter of the locking rib 12 of the other pipe socket (or the outside diameter of locking rib 12 of pipe socket 1 is selected smaller than the outside diameter of the locking rib 12 of pipe socket 2), as shown in FIG. 2, so that by a suitably small amount of spreading of the spring band 3, only one of the pipe sockets, pipe socket 1 in the present case, can be decoupled.

According to FIG. 3, the same function can be realized with locking ribs 12 of equal outside diameters by making one of the flanges 8 radially shorter (with smaller radial height), e.g., the flange 8 shown on the left in FIG. 3, than the other flange 8.

Figure 5:
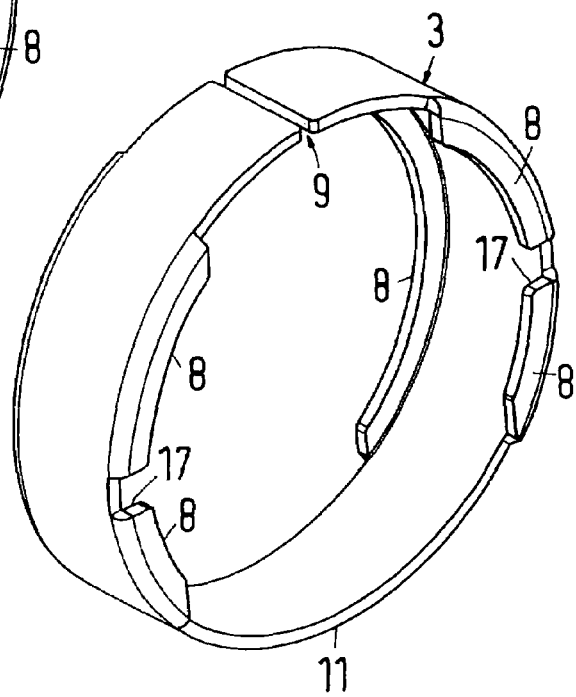
FIG. 5 is a perspective view of a spring band that is somewhat modified from the spring band according to FIG. 4.
Figure 6:
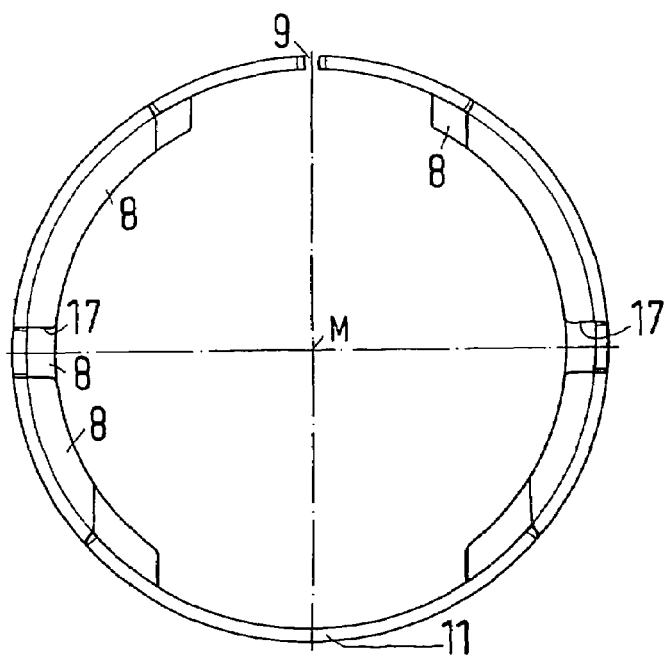
FIG. 6 shows an axial view of the spring band according to FIG. 5.

In accordance with a fourth possibility, as shown in FIGS. 5 and 6, the flanges 8 formed on one of the axial ends of the spring band 3 are formed shorter in the circumferential direction than the flanges 8 axially opposite them on the other axial end of the spring band 3. Therefore, the flanges 8 that are shorter in the circumferential direction extend only over a smaller angle of wrap in their groove 13, so that when the spring band 3 is spread to decouple the pipe sockets 1, 2, they first snap out behind the locking rib 12 that bounds this groove 13, and just the pipe socket in question can be decoupled if the spring band 3 is not spread further.

As FIGS. 5 and 6 also show, the flanges 8 formed on one of the axial ends of the spring band 3 or only one of the flanges can be provided with a narrow radial opening 17. A radial projection (not shown) on the pipe socket inserted in this axial end of the spring band 3 can be inserted into this radial opening 17. As a result, spring band 3, which otherwise can rotate on both pipe sockets 1, 2, can now be rotated relative to only one of the two pipe sockets, when this is desired, although rotatability has the advantage that the slit 9 can be rotated in each case into the position relative to the pipe sockets 1, 2 in which the slit 9 is readily accessible for spreading, i.e., for the insertion of a spreading tool.

Whereinas in the embodiment of the spring band 3 according to FIG. 4, the circumferential ends of the spring band can come together when the spring band fits around the pipe sockets under its spring tension, but a spreading tool can nevertheless be inserted in the recesses 10, in the modification of the spring band 3 according to FIGS. 5 and 6, the recesses 10 are eliminated, so that in the tensioned state of the spring band 3, while it rests against the pipe sockets 1, 2, the slit 9 is not completely closed but rather is up to about 2 mm wide, so that, for example, the blade of a screwdriver can be easily inserted in the slit 9 to spread the spring band.

Figure 7:
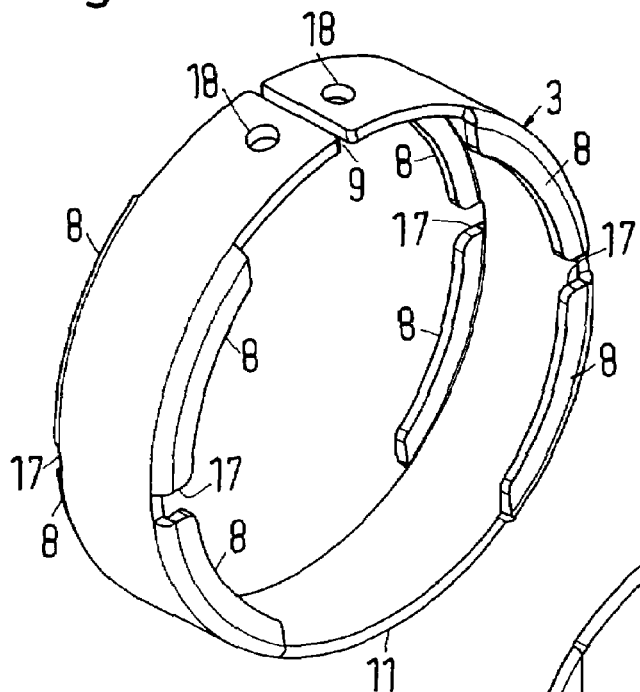
FIG. 7 is a perspective view of another spring band that is somewhat modified from the spring band according to FIG. 4.

The spring band 3 in FIG. 7 differs from the spring band in FIG. 4 in that all of the flanges 8 are provided with an opening 17, into which a radial projection on the pipe socket inserted into the given axial end can be inserted to allow the spring band 3 to be mounted in a predetermined rotational angular position relative to the two pipe sockets 1, 2. In addition, holes 18 that pass radially through the spring band 3 are formed near the circumferential ends of the spring band 3 to allow the insertion of a spreading tool, e.g., spreading pliers. Therefore, the recesses 10 provided in the spring band 3 according to FIG. 4 are eliminated here. However, in the coupled state of the pipe sockets 1, 2, the circumferential ends of the spring band 3 can be separated according to the width of the slit. Alternatively, the spring band 3 can be dimensioned in such a way that in the coupled state of the pipe sockets 1, 2, its circumferential ends rest against each other, and the spring band 3 tightly surrounds the pipe sockets 1, 2.

Figure 8:
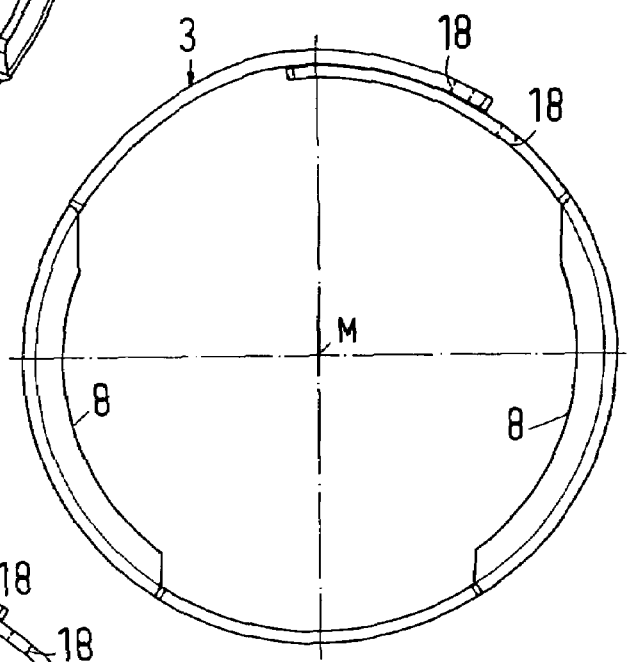
FIG. 8 is an axial view of another spring band that is somewhat modified from the spring band according to FIG. 4.

The spring band 3 in FIG. 8 differs from the spring band in FIG. 4 in that in the coupled state of the pipe sockets 1, 2, the end sections of the spring band 3 overlap each other and are also provided with holes 18 for the insertion of a spreading tool. The purpose of the overlapping is to prevent one from pinching one's hand in the slit 9 provided in the spring bands described above during the coupling and decoupling of the pipe sockets 1, 2. Moreover, the spring band 3 can completely cover the sealing gap between the pipe sockets with greater reliability, regardless of different dimensional tolerances, in order to prevent the penetration of dirt and, in case of fire, flames.

Figure 9:
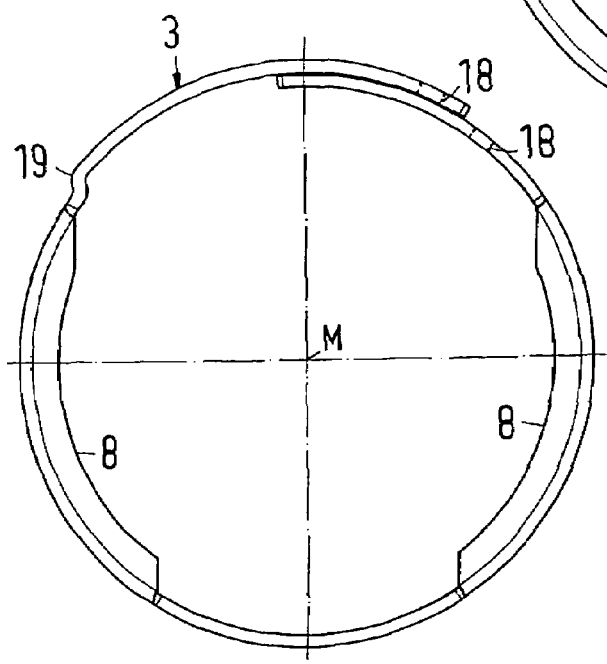
FIG. 9 is an axial view of another spring band that is somewhat modified from the spring band according to FIG. 8.

The spring band 3 in FIG. 9 differs from the spring band in FIG. 8 only in that the outer end section of the spring band has an offsetting bend 19 corresponding to the thickness of the spring band 3. This offsetting bend 19 reliably prevents the formation of a gap between the overlapping end sections when the spring band contracts.

The overlapping according to FIGS. 8 and 9 can also be provided in the spring bands described above and below.

The spring band 3 according to FIGS. 10 and 11 differs from the spring band in FIG. 7 in that the flanges 8 on both sides of the joint 11 and on both sides of the slit 9 are not interrupted but with the axial middle region of the spring band 3 that joins the flanges 8 encloses an angle β which is smaller than the 90° angle of the spring bands 3 described above and below and is in the range of 15-85° and preferably 15-75°. An angle β of 75° is shown in the drawing. The angle β not only facilitates the insertion of the pipe sockets 1, 2 into the spring band 3 but also increases the stiffness of the flanges 8 to prevent them from bending up under the internal pressure of the coupling assembly.

Figure 12:
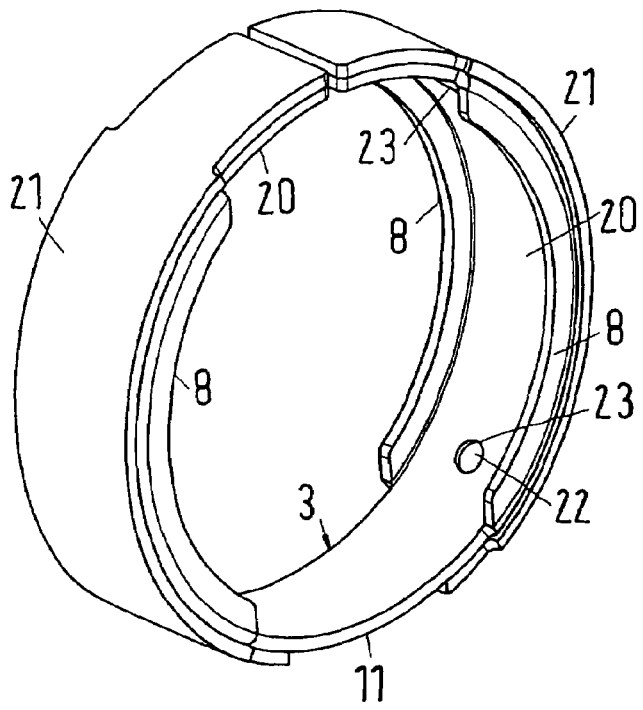
FIG. 12 is a perspective view of another spring band that is somewhat modified from the spring band according to FIG. 1.
Figure 13:
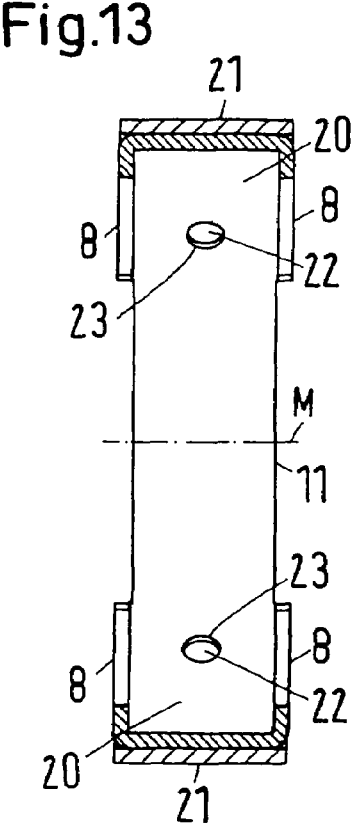
FIG. 13 is an axial section of the spring band according to FIG. 12.

In the spring band 3 according to FIGS. 12 and 13, plastic covers 21 are attached by positive locking on the radially outer side of circumferential end sections 20 of the spring band 3. For this purpose, radially inwardly extending projections 22 of the covers 21 are snapped into holes 23 in the circumferential end sections 20 of the spring band 3. These covers 21 provide the spring band 3 with considerable protection against shock loads.

Figure 14:
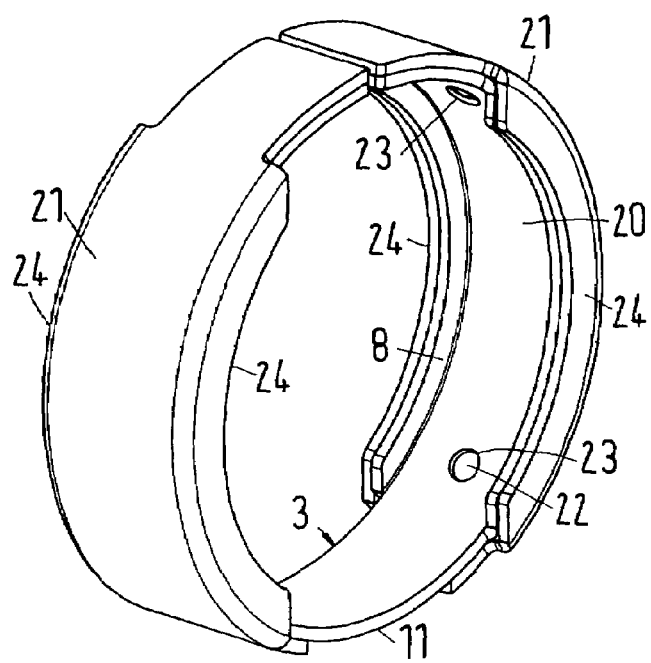
FIG. 14 is a perspective view of a spring band that is somewhat modified from the spring band according to FIG. 12.
Figure 15:
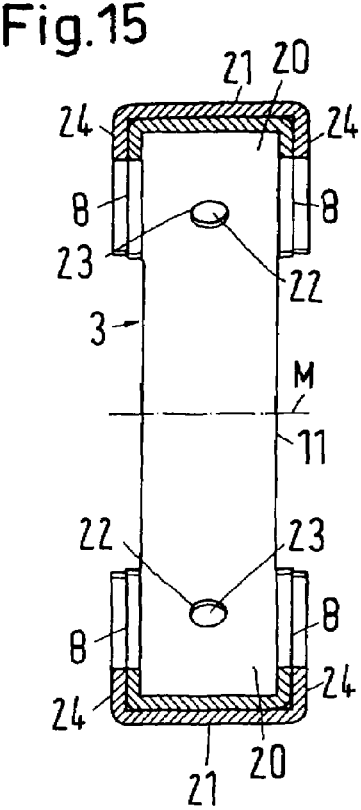
FIG. 15 is an axial section of the spring band according to FIG. 14.

While the covers 21 in FIGS. 12 and 13 do not cover the flanges 8 of the spring band 3, in the spring band 3 according to FIGS. 14 and 15, the flanges 8 are also covered by radial flanges 24 of the covers 21.

Figure 16:
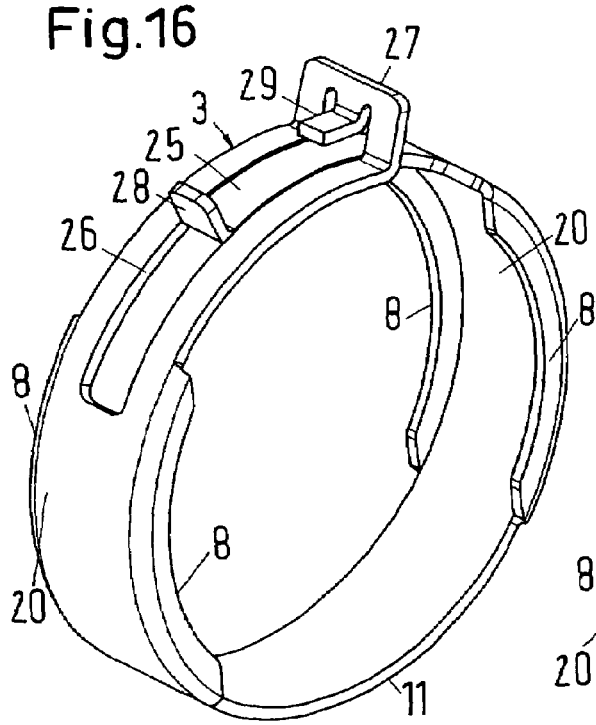
FIG. 16 is a perspective view of a spring band that is somewhat modified from the preceding spring bands.

In the spring band 3 shown in FIG. 16, one of the circumferential end sections 20 of the spring band has a narrower end piece 25, which extends into a circumferential slot 26 of the other circumferential end section 20 of the spring band 3. In addition, the circumferential end sections 20 of the spring band 3 are each provided with a projection 27 or 28 that is directed away from the outside of the spring band 3. The projections 27, 28 are used for the application of a spreading tool and are formed by bending up the ends of the circumferential end sections of the spring band 3. In addition, the projection 27 is provided with a tongue 29, which is bent downward at one end of the slot 26 and is stopped against the projection 28 in the maximum spread position of the spring band 3, thereby limiting the spreading distance. The spring band 3 is the same as a conventional spring band clip, except for the flange 8, and therefore can be produced in the same way as the conventional spring band clip with similar tools and from the same material. Furthermore, due to the end piece 25 extending into the slot 26, the circumferential end sections 20 also overlap in similar fashion to the spring bands 3 according to FIGS. 8 and 9. The projections 27 and 28 act as spreading grips in the same way as in a conventional spring band clip.

Figure 17:
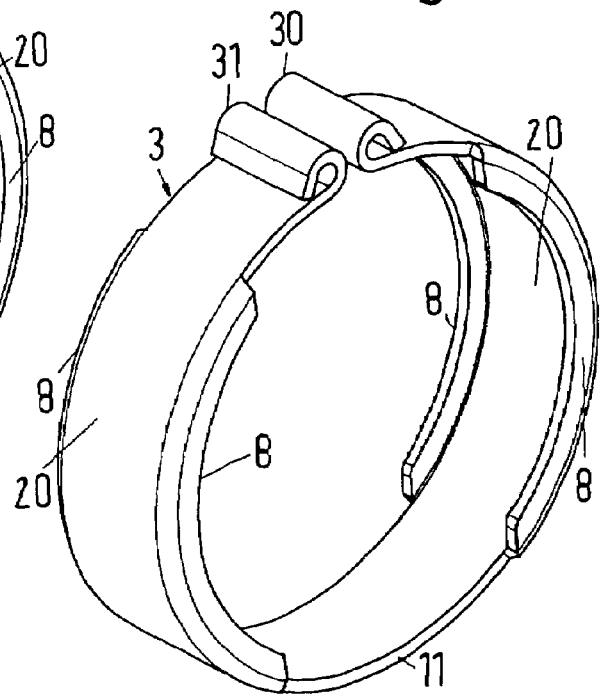
FIG. 17 is a perspective view of another spring band that is somewhat modified from the spring band according to FIG. 4.

The spring band 3 according to FIG. 17 differs from the spring band in FIG. 16 in that the free ends of the spring band are bent back to the end sections 20 to form more or less hollow cylindrical projections 30, 31, which likewise serve as spreading grips for the application of a spreading tool, either between the projections 30, 31 or in the hollow cavities they form. Therefore, they likewise act as spreading grips. The projections 27 and 28 in the spring band 3 according to FIG. 16 can also be bent over to form hollow cylindrical projections like the projections 30, 31 in the spring band 3 according to FIG. 17, and, in addition, the end piece 25 of the spring band in FIG. 16 can extend through the slot 26.

Figure 10:
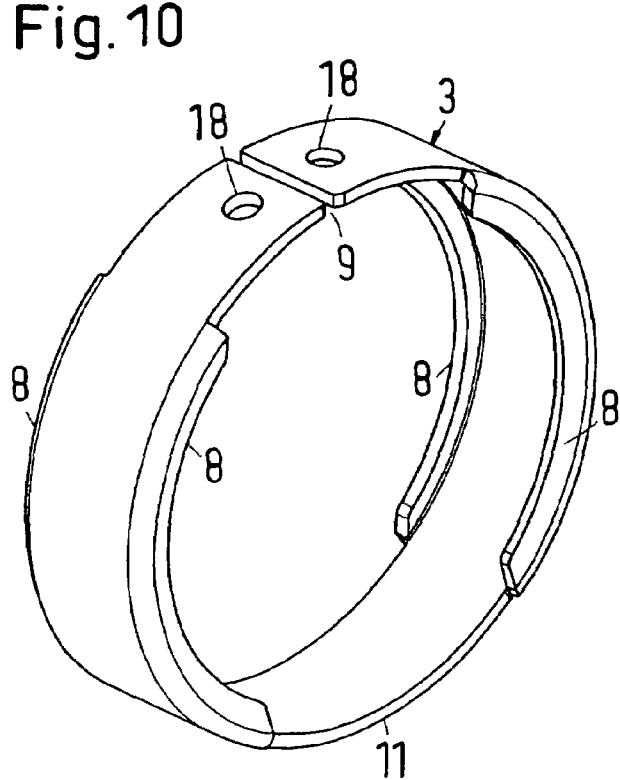
FIG. 10 is a perspective view of another spring band that is somewhat modified from the spring band according to FIG. 1.
Figure 11:
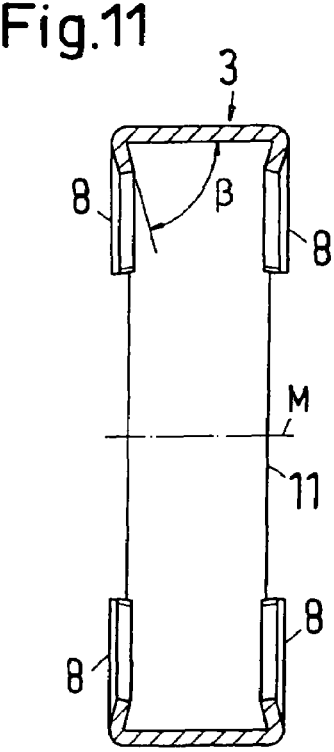
FIG. 11 is an axial section of the spring band according to FIG. 10.

In the embodiment of the coupling assembly according to FIGS. 18 to 21, the spring band 3 preassembled on the pipe socket 1, which has the same design as the spring band 3 according to FIG. 10 but with an angle β according to FIG. 11 of 90°, is joined by a connecting piece 32, which is formed as a single part with the spring band 3, with a conventional hose clip 33, here a worm drive hose clip, by which a fluid line 34 in the form of an elastic plastic or rubber hose is connected with the pipe socket 1. The joint between the connecting piece 32 and the tightening band 35 of the hose clip 33 can be a welded joint, e.g., a spot weld, or it can be a positive-locking connection.

After the tightening band 3 has been preassembled on the pipe socket 1 together with the hose clip 33 in the manner described above, the fluid line 34 is pushed onto the ribbed end section of the pipe socket 1 with the hose clip 33 still open, and then the hose clip 33 is tightened, so that it clamps the fluid line 34 on the pipe socket.

This design has the advantage that the spring band 3 and the hose clip 33 are preassembled on the pipe socket 1 and can be delivered to an automobile manufacturer for final assembly. The automobile manufacturer can carry out the final assembly in a simple way by putting the pipe sockets 1, 2 together and connecting the fluid line.

The parts of the coupling assembly shown in FIGS. 22 to 25 correspond to the parts shown in FIGS. 18 to 21, except that a conventional spring band clip 36 is provided as the hose clip, and the spring band 3 is joined as a single part with the spring clip 36 by the connecting piece 32. This design has the advantage that the spring band 3 and the spring band clip 36 can be formed as a single part and produced from the same material.

Instead of a worm drive hose clip or a spring band clip, a squeeze clip can also be used as the hose clip and can be joined with the spring band 3 by a connecting piece 32.

The coupling assembly illustrated in FIGS. 26 and 27 is largely the same as the one illustrated in FIG. 1, except that the pipe socket 1 is provided with a locking rib 37 that is largely rectangular in cross section and has no annular grooves for receiving the gaskets 5, that the locking rib 12 extends beyond the free end of the part of the pipe socket 1 that is inserted into the pipe socket 2 and on its inner surface is provided with annular grooves that receive the gaskets 5, and that the flanges 8 of the spring band 3 have a segment 38 that is bent radially inward and a segment 39 that is bent obliquely outward, wherein the oblique segment 39 encloses an angle γ with the center axis M of each pipe socket 1, 2 in the range of 10° to 60°, and the diameter of the radially inner edges of the radially outer margins of the oblique segments 39 is greater than the diameter of the locking rib 37 or of the smallest diameter of the front flank 14 of the locking rib 12. In addition, however, the axial width of at least one of the flanges 8, here both flanges 8, corresponds to the width of at least the one groove 13, if only one is provided.

This design has the advantage that when the pipe ends 1, 2 are put together, the flanges 8 of the spring band 3 do not slide beyond the gaskets 5, but also the sealing surface of the pipe socket 1 that interacts with the gaskets 5 remains largely undamaged by the radially inner margins of the flanges 8 during the assembly of the pipe sockets 1, 2, because these margins are largely round and not sharp-edged. The radially inner edges of the radially outer margins of the oblique segments 39 have a greater diameter than either the locking rib 37 or the circumference of the front flank 14 of the locking rib 12. Therefore, during the assembly of the pipe sockets 1, 2, the oblique segments 39 slide easily, on the one hand, over the edge of the locking rib 37 that faces away from the flank 14 and, on the other hand, over the radially inner edge of the front flank 14 that faces the locking rib 37. As is clearly seen in FIG. 27, in which the pipe socket 1 is not shown, the oblique segments 39 are conical.

The coupling assembly according to FIG. 28 differs from the coupling assembly illustrated in FIGS. 26 and 27 only in that the groove 13 shown on the right in FIGS. 26 and 27 is formed immediately next to an axially shorter locking rib 12, as in the case of the coupling assembly according to FIG. 1, and only as deep as the grooves 13 in FIG. 1, so that the tightening band 3 of the coupling assembly according to FIG. 28 is significantly narrower than the tightening band 3 of the coupling assembly according to FIGS. 26 and 27.

FIG. 29 shows a spring band 3 which is modified from the spring band according to FIGS. 26 to 28 in that the oblique segments 39 are rounded, so that the radially inner edge of the flange 8 is considerably more rounded.

Figures 30, 31, 32, 33:
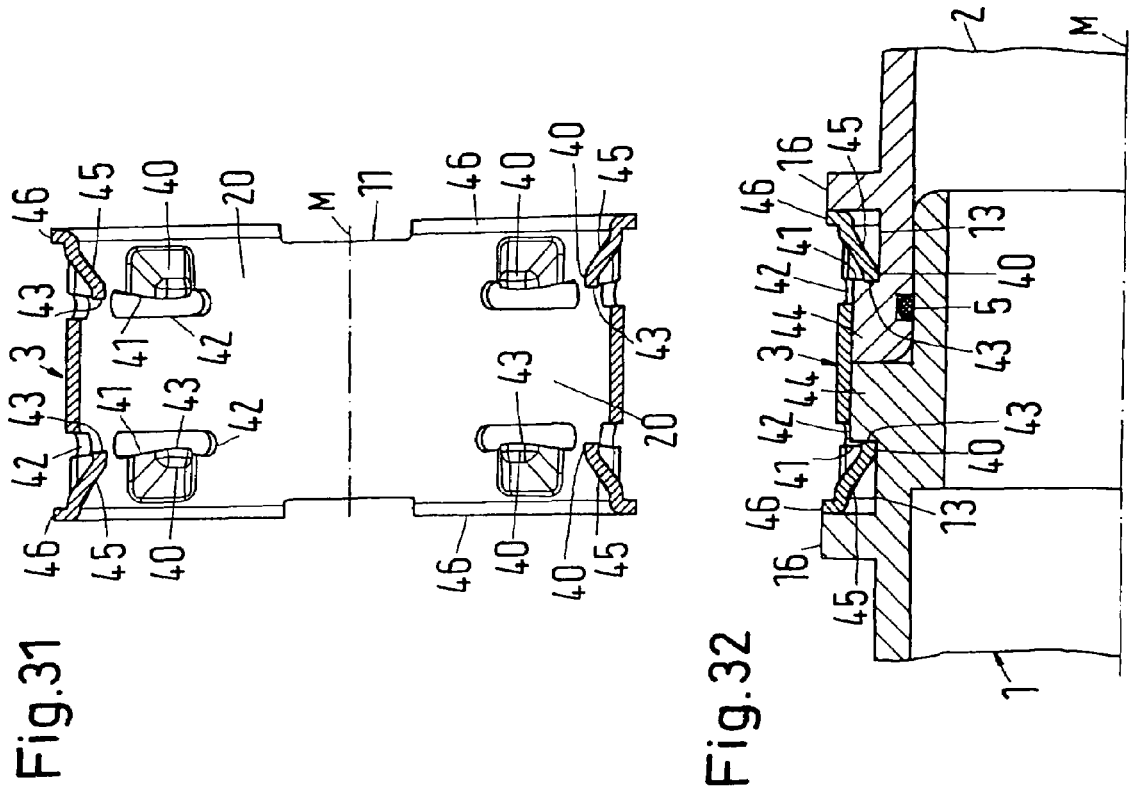
FIG. 30 is a perspective view of another spring band that is somewhat modified from the preceding spring band.
FIG. 31 is an axial section through the spring band according to FIG. 30.
FIG. 32 is an axial section through a modified coupling assembly with a spring band according to FIGS. 30 and 31.
FIG. 33 is a perspective drawing of a spring band that is somewhat modified from the spring band according to FIG. 30.

In the spring band 3 illustrated in FIGS. 30 to 32, instead of the flanges 8, radially inwardly directed projections 40 in the form of detents are pushed out from the circumferential end sections 20 of the spring band 3 in two parallel radial planes near the axial ends of the spring band 3. The projections 40 are each pushed out at one of the edges 41 of circumferential slots 42 of limited length in the spring band 3. The circumferential slots 42 are oblong holes, each of which has a tongue that is directed transversely to the oblong hole in the flat state of the spring band. In the state of the projection 40 in which it is pushed out of the spring band 3, the edge of the tongue forms a radial contact surface 43 for contact with one of the locking ribs 44. However, instead of a rectangular cross section, the locking ribs 44 can also be formed more or less triangularly with an oblique front flank, like the front flank 14 of the locking ribs 12 according to FIG. 1. The projections 40 also have an oblique overrunning surface 45, with which they slide over the radially outer, facing edges of the locking ribs 44 during the insertion of the pipe sockets 1, 2 into the spring band 3 until they snap into the grooves 13 behind the rear flanks of the locking ribs 44.

The design of the spring band 3 with the projections 40 has the advantage that the projections 40 withstand relatively large axial forces caused by the internal pressure of the pipe sockets 1, 2. Furthermore, the pressure of the contact surfaces 43 of the projections 40 acts on the locking ribs 44 practically only on the radially inner end of the rear flanks of the locking ribs 44, so that the locking ribs 44 are subject to practically no bending forces even in the case of an axially narrower design or a design with an oblique front flank on the radially outer edge. The shape of the pipe sockets 1, 2 with only two radially relatively short flanges 16 bounding the grooves 13 allows simple production of the pipe sockets 1, 2 not only from plastic but also from metal. In this design as well, the width of the grooves 13 is essentially the same as the axial width of the projections 40, including the width of radially short, outwardly directed reinforcing flanges 46 at the axial ends of the spring band 3. The reinforcing flanges 46 increase the flexural stiffness of the circumferential end sections 20 but leave the edges of the elastically yielding joint 11 open.

While the projections 40 in the embodiment of the spring band according to FIGS. 30 to 32 lie axially opposite each other, in the spring band 3 according to FIG. 33, they are circumferentially displaced from each other. This increases the axial tensile strength of the spring band 3 according to FIG. 33 compared to that of the spring band 3 illustrated in FIGS. 30 to 32.

The illustrated embodiments can be modified, for example, by combined features of the individual specific embodiments with one another.

While specific embodiments of the invention have been shown and described in detail to illustrate the inventive principles, it will be understood that the invention may be embodied otherwise without departing from such principles.

We claim:

1. A coupling assembly comprising:
   pipe sockets of fluid-holding parts to be joined,
   wherein the pipe sockets are each provided with a locking rib that is coaxial with a center axis of the pipe sockets,
   behind each locking rib a groove being formed and each locking rib having a conical front flank that is coaxial with the center axis and a radial rear flank,
   wherein the front flank of one of the locking ribs is located opposite the front flank of the other locking rib, and the rear flank of at least one of the locking ribs forms one of the walls of the adjacent groove, and with
   a steel spring band which is largely circularly curved over more than 240° and whose axial ends have inwardly directed flanges with an inner edge that has the approximate form of a circular arc and is coaxial with the center axis, the flanges engaging behind the locking ribs and being interrupted at least on an axial side of the spring band, and
   wherein the pipe sockets are partially fitted into each other, and the parts of the pipe sockets that are fitted together are sealed from each other by at least one gasket,
   wherein the front flanks of the locking ribs enclose an angle $\alpha$ smaller than 50° with the center axis,
   wherein the radius of the smallest circumference of the front flanks of the locking ribs is smaller than the inner radius of the flanges of the spring band,
   wherein the axial width of the flanges corresponds to the width of the groove holding the flanges, and
   wherein the spring band is noncorroding.

2. A coupling assembly in accordance with claim 1, wherein the flanges provided at one axial end of the spring band are shorter in the circumferential direction of the spring band than the flanges provided at the other axial end of the spring band.

3. A coupling assembly in accordance with claim 1, wherein the flanges provided at one axial end of the spring band are shorter in the radial direction than the flanges provided at the other axial end of the spring band.

4. A coupling assembly in accordance with claim 1, wherein the outside diameter of one locking rib is greater than that of the other locking rib.

5. A coupling assembly in accordance with claim 1, wherein at least at one axial end of the spring band at least one of the flanges has a radial opening for the insertion of a radial projection on the pipe socket inserted in this axial end.

6. A coupling assembly in accordance with claim 1, wherein the circumferential ends of the spring band bound an axial slit having a width of 0-2 mm.

7. A coupling assembly in accordance with claim 6, wherein the circumferential ends of the spring band have recesses to allow the insertion of a spreading tool.

8. A coupling assembly in accordance with claim 6, wherein circumferential end sections of the spring band have holes close to the slit for the insertion of a spreading tool.

9. A coupling assembly in accordance with claim 1, wherein circumferential end sections of the spring band overlap.

10. A coupling assembly in accordance with claim 9, wherein one of the circumferential end sections of the spring band has a narrower end piece which extends into a circumferential slot of the other circumferential end section of the spring band.

11. A coupling assembly in accordance with claim 9, wherein the circumferential end sections of the spring band each have a projection directed away from the outer surface of the spring band for the application of a spreading tool.

12. A coupling assembly in accordance with claim 11, wherein the projections are formed by bending up the circumferential end sections of the spring band.

13. A coupling assembly in accordance with claim 9, wherein the circumferential end sections of the spring band have spreading grips.

14. A coupling assembly in accordance with claim 1, wherein plastic covers are attached on the outside of circumferential end sections of the spring band.

15. A coupling assembly in accordance with claim 14, wherein the covers are attached by positive locking on the circumferential end sections of the spring band.

16. A coupling assembly in accordance with claim 15, wherein radial projections of the covers snap into holes in the circumferential end sections of the spring band.

17. A coupling assembly in accordance with claim 14, wherein the covers have radial flanges that cover the flanges of the spring band.

18. A coupling assembly in accordance with claim 1, wherein a cover surrounds one of the pipe sockets at a radial distance that corresponds to a maximum required spreading width of the spring band and has an axial slit that leaves circumferential end sections of the spring band open.

19. A coupling assembly in accordance with claim 18, wherein the cover is attached radially on one of the pipe sockets by a snap fitting.

20. A coupling assembly in accordance with claim 1, wherein the flanges and the axial middle region of the spring band that joins them encloses an angle in the range of 15° to 90°.

21. A coupling assembly in accordance with claim 1, wherein the spring band is connected by a connecting piece with a hose clip for clamping a fluid line on one of the pipe sockets.

22. A coupling assembly in accordance with claim 1, wherein the pipe sockets are of plastic.

23. A coupling assembly in accordance with claim 22, wherein the pipe sockets contain an electrically conducting additive.

* * * * *